US006423219B1

(12) United States Patent
Chandler

(10) Patent No.: US 6,423,219 B1
(45) Date of Patent: Jul. 23, 2002

(54) SYSTEM AND METHOD FOR CONTROLLING MICROORGANISMS AND BIOFILMS

(76) Inventor: James W. Chandler, 1554 Township Rd. 805, Ashland, OH (US) 44805

( * ) Notice: Subject to any disclaimer, the term of this patent is extended or adjusted under 35 U.S.C. 154(b) by 0 days.

(21) Appl. No.: 09/662,097

(22) Filed: Sep. 14, 2000

Related U.S. Application Data

(60) Provisional application No. 60/153,871, filed on Sep. 14, 1999.

(51) Int. Cl.[7] .................................................. B08B 3/04
(52) U.S. Cl. ............... 210/198.1; 210/136; 210/203; 210/205; 210/257.1; 210/257; 134/102.2; 134/169 C; 137/268
(58) Field of Search ................................ 210/764, 136, 210/198.1, 201, 202, 203, 205, 258, 257.1, 338, 440, 443, 206; 422/14, 41, 224, 28, 33; 239/311, 302, 354; 433/82, 88, 84, 98, 95; 134/102.2, 169 C, 95.1; 137/240, 268

(56) References Cited

U.S. PATENT DOCUMENTS

| | | | |
|---|---|---|---|
| 4,667,691 A | * | 5/1987 | Sasa |
| 4,892,112 A | | 1/1990 | Knetsch |
| 5,133,878 A | * | 7/1992 | Gsell et al. |
| 5,401,399 A | | 3/1995 | Magnusson et al. |
| 5,526,841 A | | 6/1996 | Detsch et al. |
| 5,709,546 A | | 1/1998 | Waggoner |
| 5,785,523 A | | 7/1998 | Overmyer |
| 5,800,803 A | | 9/1998 | Mirajkar et al. |
| 5,906,825 A | * | 5/1999 | Seabrook, Jr. et al. |

FOREIGN PATENT DOCUMENTS

| | | | |
|---|---|---|---|
| WO | WO-96/29098 A1 | * | 9/1996 |
| WO | WO-98/13074 A1 | * | 4/1998 |

OTHER PUBLICATIONS

Dental Unit Waterlines: Is This One of Dentistry's Compelling Problems? Rella P. Christensen, PhD, Brad J. Ploeger, Derek K. Hein, Infection Control, Dentistry Today, Jan. 1998, pp. 80–85.
Sunlase® Pulsed Nd: Yag Lasers, Lares Research Your Cutting Edge, 3 pages, date not available.
Microprep® Air Abrasion Cavity Preparation Systems, Lares Research Your Cutting Edge, 2 pages, Date not available.
AquaSept Autoclavable Independent Water Delivery System, Your Most effective and Economical Solution to Waterline Contamination, 1 page, Date not available.
Water Bottle Kits & Accessories, BSD OnLine Catalog—Water Bottle Kits & Acce . . ., Beaverstate–Dental, Inc. pp. 1–5, date Mar. 26, 1999.
ADA Statement on Dental Unit Waterlines, A Statement on Dental Unit Waterlines, 3 pages, Mar. 12, 1999.

* cited by examiner

*Primary Examiner*—Joseph W. Drodge
*Assistant Examiner*—Terry K. Cecil
(74) *Attorney, Agent, or Firm*—Nenad Pejic; Calfee, Halter & Griswold LLP

(57) ABSTRACT

Systems and methods for controlling the presence and growth of microorganisms and biofilms in water lines is provided. The systems include, for example, a valved, multi-port control manifold for accepting inlet water to be treated and a filter for (1) reducing particulate physical matter, (2) further reducing particulate matter while also reducing the content of absorbable organics, and (3) physically removing microorganisms. The system further includes a mixing reservoir or chamber with specialized means for injecting active agents such as biocides for additional control of planktonic and sessile microbes. An optional pressurized storage vessel for retaining and delivering filtered and treated water is also disclosed. The methods include, for example, the step of introducing an aqueous cleaner derived from natural citrus botanicals into a water system.

35 Claims, 8 Drawing Sheets

SYSTEM AND METHOD FOR CONTROLLING MICROORGANISMS AND BIOFILMS

This application claims the benefit of U.S. Provisional Application No. 60,153,871, filed Sep. 14, 1999.

FIELD OF THE INVENTION

This invention relates generally to the control of microorganisms and biofilms, and more particularly, to systems and methods for controlling microorganisms and biofilms in water lines through a combination of physical filtration, organic absorption, and chemical treatment.

BACKGROUND OF THE INVENTION

Microorganisms occur virtually everywhere in our environment including the air, water, hard and soft surfaces, in human and animal organs, blood and tissues. Some present no serious health concerns and are considered non-pathogenic. However, other microorganisms exist that can produce a wide variety of infections and other medical ailments that can result in diseases or even death. Such organisms are considered pathogenic. When conditions are not adverse, all such organisms are able to grow and multiply into vast concentrations and population diversity often manifesting themselves into mass accumulations with vastly resilient properties known as biofilms. Although biofilms have been ever-present in our ecosystem and bodies, they have only recently become known to have such a potentially devastating influence in problems relating to everything from plugged piping and corroded metals to production of progeny that can cause additional damage and infect both animals and humans.

Microorganisms are generally classified into groups known as bacteria, algae, fungi and yeast, protozoa and viruses. Of particular relevance to the present invention are microorganisms related to the production of water for general potability, as well as dental, medical and other specialized water uses that usually require even more meticulous control over the presence, concentration, and removal of such entities. Organisms that are free-floating in a liquid medium are known as "planktonic." Organisms that have attached themselves to piping, organs, tissues and other surfaces are known as "sessile." It has been shown that the majority of microbial infections in the body are caused by sessile communities of organisms known as biofilms.

Biofilms are basically aggregate communities of organisms having a heterogeneous nature that are formed on solid surfaces and can be potential reservoirs for enteric pathogenic bacteria. Dental plaque is probably one of the best known types of biofilms. Biofilms attach themselves by proteinaceous appendages called fimbriae that "glue" themselves to available surfaces. Other building blocks that are important in creating the physical structure of biofilms include, for example, organic content in the water that serves as both a food source and potential structural components, slimy extra-cellular biopolymer secretions created by the organisms themselves, cellular components from organisms that have died-off and other factors. The extra-cellular biopolymer consists mainly of water and polysaccharides. These biopolymers provide a thickening effect that helps to stabilize the biofilm even in the presence of a passing water flow. Divalent cations such as calcium and magnesium help to cause gelation of some of the biopolymers for an even stronger biofilm structure due to an electrostatic interaction between carboxyolates on the polysaccharides and the cations creating a bridging phenomenon. Therefore, hard water that contains calcium and magnesium serves to provide conditions favorable to the creation of even more resilient structures. Consequently, biofilms can cause the plugging and/or corrosion of piping and present a threat to humans and animals alike for infection and disease. Hence, it is desirable to provide a system and method for controlling microorganisms and biofilms in water lines.

SUMMARY OF THE INVENTION

According to a first embodiment of the present invention, a system for controlling the presence of biofilms and microorganisms in fluids is provided that is particularly suited for supplying a large medical or dental operatory. In particular, the system includes an inlet for connection to a water source, a filter in fluid communication with the inlet, a mixing reservoir in fluid communication with the filter and having an active agent input. The mixing reservoir provides for the mixing of water and the active agent. The active agent input is preferably a reverse check-valve. A pressurized storage tank is in fluid communication with the mixing reservoir and stores the mixed fluid and active agent. The pressurized storage tank preferably includes a pre-charged air chamber for generating an internal pressure in the tank that can be used to internally force fluid out from the tank. A control manifold is in fluid communication with the pressurized storage tank and controls the flow of fluid in the system.

The filter includes, for example, a first filter for removing particulate matter from the fluid, a second filter for removing carbon-activated matter from the fluid, and a third filter for removing bacterial matter from the fluid. The first filter preferably comprises a blown polypropylene element. The second filter preferably comprises a porous carbon block element. The third filter comprises a porous ceramic element.

The present invention also provides a system for controlling biofilms and microorganisms in medical or dental water operatories that is particularly suited for installations where space is limited. The system includes a combination manifold and mixing chamber that is in fluid communication with a combination pre-filter and bio-filter. The combination manifold and mixing chamber includes an active agent input, water inlet and pressurized air inlet. The active agent input is preferably in the form of a reverse check valve and feeds into a mixing chamber located within the combination manifold and mixing chamber. The combination pre-filter and bio-filter is in fluid communication with the water feed inlet and the mixing chamber of the combination manifold and mixing chamber. The pre-filter removes particulate matter and carbon-activated matter from the water and the bio-filter removes bacterial matter from the water. A plurality of valves are provided for controlling the fluid output of the combination manifold and mixing chamber.

The active agent can be biocidal, antiseptic, or both. The terms "biocidal," "biocide," and "antiseptic" are used hereinafter to denote any substance or effect that causes mortality in biofilms and/or microorganisms. One such suitable biocidal active agent is a chemical composition containing hydroperoxide ions, a phase transfer catalyst, and a tracer color. The system of the present invention can also employ the continuous presence of an antiseptic active agent. One such antiseptic agent preferably includes an aqueous cleaner derived from natural citrus botanicals such as, for example, grapefruit seed extract. Other active agents include, for example, Ultra-Kleen manufactured by Sterilex Corp., Bio-2000 manufactured by Micrylium Labs., and Eradic-All manufactured by Theratechnologies.

The present invention also provides a method of controlling biofilms and microorganisms in dental water systems. The method include the steps of: filtering water for matter selected from the group consisting of: particulate matter, carbon-activated matter, bacterial matter, and combinations thereof; mixing an active agent for controlling biofilms and microorganisms with the filtered water to create a mixture; and causing the mixture to flow through the dental water system. The step of mixing an active agent for controlling biofilms and microorganisms with the filtered water to create a mixture includes mixing a biocidal or antiseptic active agent with the filtered water.

It is therefore an object of the present invention to provide a method and system of controlling biofilms and microorganisms in fluids that does not require the use of electricity for operation.

It is a further object of this invention to provide a method and system of controlling biofilms and microorganisms in dental water lines that is capable of employing the constant presence of an antiseptic active agent in the water.

It is a further object of the present invention to provide a system and method of remotely filtering water.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
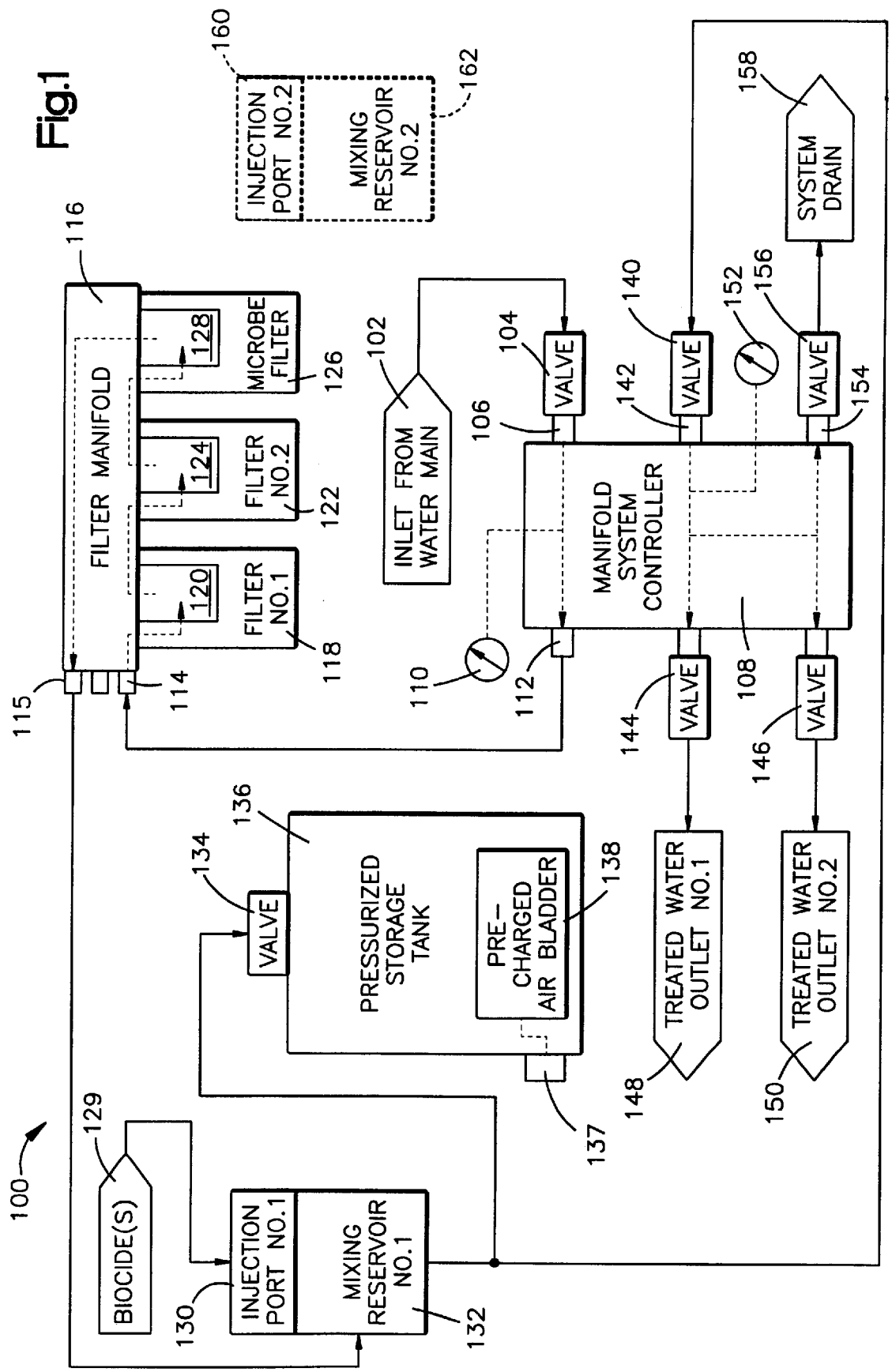
FIG. 1 is a block diagram illustrating a first embodiment of the present invention.

Referring now to FIG. 1, a block diagram of the first embodiment 100 of the present invention is shown. This embodiment is particularly suited for supply large medical or dental operatories where space is not a limiting consideration. In particular, water from either a public or private source 102 enters the system through a pipe or hose into a control valve 104. The piping or hoses employed by the present invention are preferably conventional ⅜" O.D.×¼" I.D. tubing, unless otherwise noted. The control valve 104 and all other valves, unless otherwise indicated, are of conventional ball-type or similar construction providing for full-on, full-on, and partial-on positions therebetween. Water proceeds directly through an inlet port 106 of a manifold system controller 108 and exits through an exit port 112. The pressure of the water is also monitored and displayed by a diaphragm-type pressure gauge 110 as it flows into the manifold system controller 108.

Upon exiting the manifold system controller 108, the water flows into an inlet port 114 of a filter manifold assembly 116. Once in the filter manifold assembly 116, the water proceeds through the manifold matrix and enters a first filter 118 for removal of turbidity and suspended matter down to 5 microns in size by a blown polypropylene element 120. The water passes downwardly through the filter 118 and penetrates inwardly through the element 120. The water then moves upwardly into the manifold matrix and downward into a second filter 122 where additional particles, if any, are removed. The water then penetrates a semi-solid carbon block 124 where chlorine, taste, odor and color residuals, if any, and certain organics are removed. The water moves upwardly through the center of the carbon element 124 back into the manifold matrix. The water then enters into microbe filter 126 where particulates, if any, and microorganisms such as, for example, bacteria and protozoa are physically removed as the water passes inwardly through a finely porous ceramic element 128 and then upwardly through the center of the ceramic and back into the manifold matrix. The filtered water then leaves the filter manifold matrix through an outlet port 115.

Figure 11:
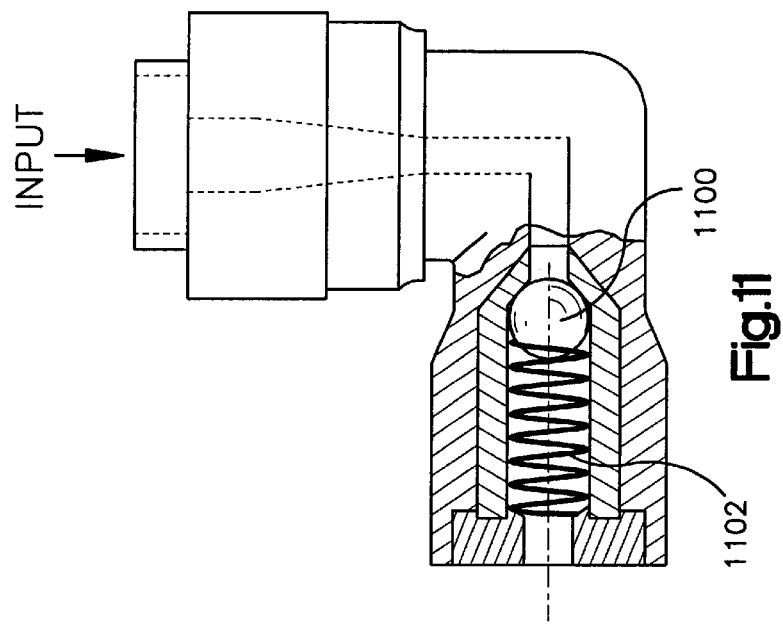
FIG. 11 is an illustration of a reverse check valve of the present invention.

The now filtered water proceeds to a first mixing reservoir 132. If active agents such as biocide(s) 129 or other chemicals are to be added, they are injected into the first mixing reservoir 132 at an active agent injection port 130. The active agent injection port preferably comprises a reverse check valve. One embodiment of a reverse check valve of the present invention is shown in FIG. 11. Referring now to FIG. 11, the reverse check valve preferably includes a ball 1100 and spring 1102. As is conventional, spring 1102 urges ball 1100 against an input aperture until the spring force is exceeded by an oppositely directed force causing ball 1100 to move away from the input aperture and allowing fluid to pass through the check valve. Active agent injection is preferably accomplished manually using a hypodermic syringe or similar device. The syringe is inserted into the reverse check valve and the active agent is injected into the mixing reservoir or chamber. Reverse check valves are particularly suitable for use because they provide for insertion of the syringe into the injection port and self-sealing of the port after injection. This procedure may be automated through conventional metering devices and automatic injection systems. The active agent(s) such as biocide(s) 129 mix with the filtered water to create a predetermined concentration of the desired treatment chemical.

Referring once again to FIG. 1, the filtered and/or chemically-treated water exits mixing reservoir 132 and enters into a pressurized storage tank 136 by passing through valve 134,. In storage tank 136, a diaphragm separates a water compartment from an air chamber 138 having a pre-charged air bladder that provides pressure to the system for delivering water to services connected at 148 and 150. The pre-charged air chamber 138 is only necessary if the main inlet 102 from the source supply of water is shut off. A conventional schraeder air valve 137 provides an inlet/outlet port for the air charge, which is preferably set at about 28 psi.

As needed, water leaves the pressurized tank 136 through valve 134 back into the multi-port manifold system controller 108 through valve 140 and inlet port 142. Inside the manifold system controller 108, the water is directed from inlet 142 and feeds outlet port valves 144 and 146. This embodiment shows two outlets from the manifold system controller 108 that can be directed to two separate locations, pieces of equipment, or dental water systems through treated water outlets 148 and 150. Dental water systems include, for example, all fluid communication devices including plumbing (i.e., hoses tubes, pipes, valves, etc.), dental drills, dental syringes, and any other piece of dental equipment requiring a source of water. Additional locations or dental water systems can be served from the same general system by creating additional outlet ports. This can be accomplished by increasing the vertical height of the manifold system controller 108 to accommodate additional outlet ports and valves. The pressure of the outlet water is read by a conventional pressure gauge 152.

When necessary or desired, the entire system 100 can be relieved of water pressure and/or drained by closing the main system inlet valve 104 on the manifold system controller 108 and the water exits via a drain port 154 and drain port valve 156. The water travels throughout the entire system and runs to a proper drain 158. If only wishing to relieve system pressure, but not drain the system, valve 104 and valve 134 on the storage tank 136 would be closed so as to save the water in storage. In this case, on opening valve 156, there would only be a momentary release of pressure and little water. If the entire system is to be drained and pressure relieved, valves 104, 134, 156 are opened effectively draining the entire system, including the contents of the storage tank 136.

Figure 2:
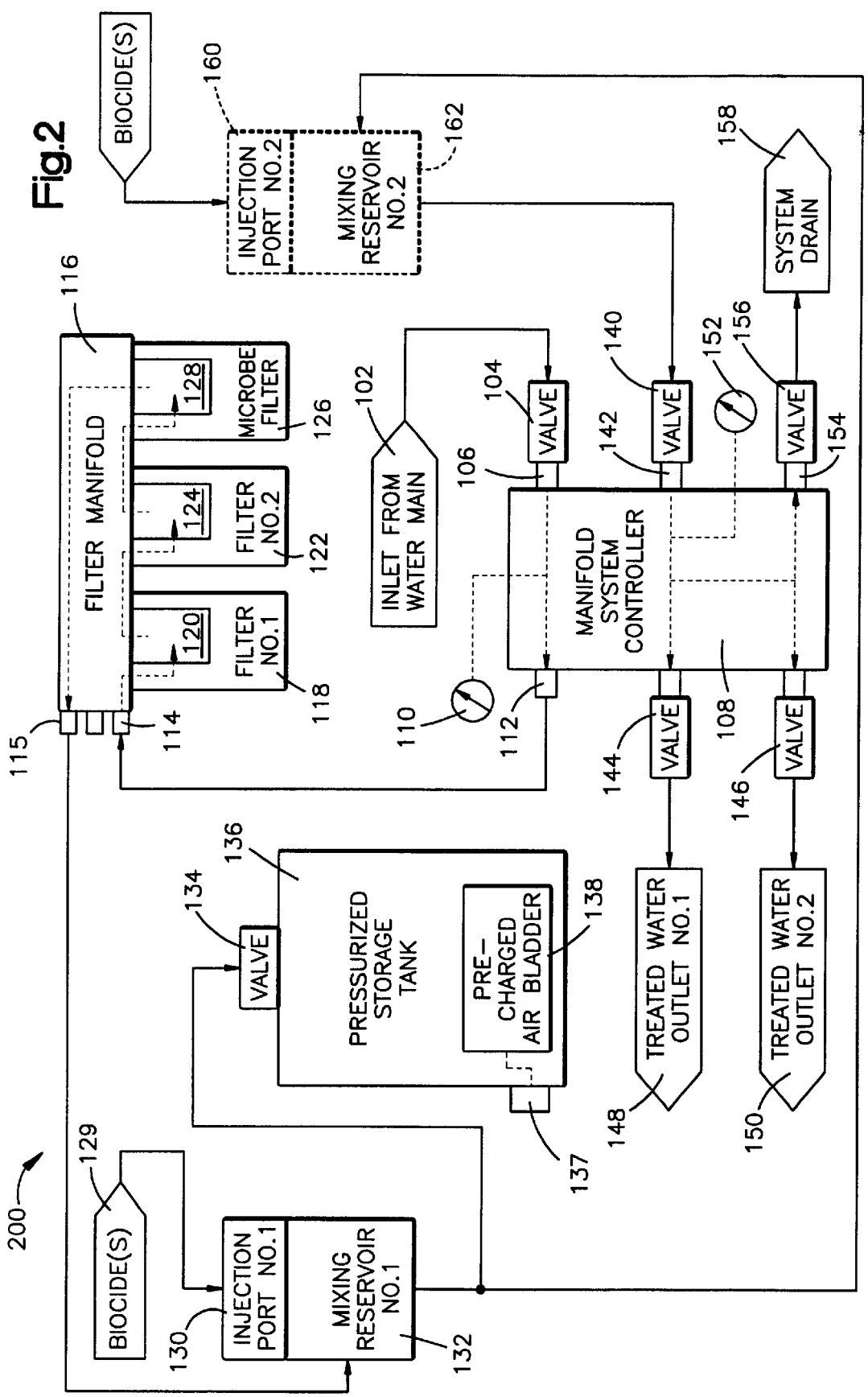
FIG. 2 is a block diagram illustrating a second embodiment of the present invention.

As shown in FIGS. 1 and 2, a second mixing reservoir 162 is optional in the event additional active agents such as biocides 159 or chemicals are to be mixed separately from the first mixing reservoir 132. Referring now to FIG. 2, a block diagram of a second embodiment 200 of the present invention is shown that incorporates the use of the second mixing reservoir 162. The element composition of the second embodiment 200 is identical to that of the first embodiment 100 and, therefore, the same reference numbers are used to indicate the same elements. The description will now focus on the use of the second mixing reservoir 162. In particular, through the use of conventional detachable tubing, water exiting pressurized storage tank 136 can be directed into second mixing reservoir 162 in a convenient and simple manner. Similar to the first mixing reservoir 132, active agents such as biocides 159 or other chemicals are added by injection into the second mixing reservoir 162 at injection port 160, passing through a conventional reverse check valve located inside injection port 160. As described earlier, active agent injection is preferably accomplished manually using a hypodermic syringe or similar device. The needle of the syringe is inserted through the reverse check valve and the active agent is injected into the mixing reservoir. Also, as describe earlier, this procedure may be automated through conventional metering devices and automatic injection systems. The active agent(s) such as biocides 159 mix with the filtered and treated water to create a predetermined concentration of the desired treatment chemical(s).

For the present invention, the preferred active agent for attacking pre-existing biofilms in piping, tubing and equipment is a composition containing hydroperoxide ions and a phase transfer catalyst. Such an active agent can be injected into the first mixing reservoir 132 and mixed with filtered water that is delivered to the pressurized storage tank 136 for delivery to the entire system of piping, tubing and attached equipment. This agent has the ability to destroy both planktonic and sessile organisms, but more importantly attacks and dissolves the structural components of the biofilm. The product should be both lipid and water soluble acting as both oxidizer and hydrolyzer. The phase transfer catalyst is mainly responsible for destruction of the structural aspects of the biofilm. Water containing the agent at about 7% concentration should be sent to all points throughout the plumbing system of the present invention until a residual of the agent emerges (as evidenced by a pink-colored tracing agent such as Lorvi Disclosing Agent). After approximately 12 hours contact within the system, excess chemical agents from the pressure tank 136 should be drained and new, fresh water allowed to enter from the filter manifold 116. All exit points downstream of the system should then be flushed or purged until such time all pink color has ceased. This procedure effectively reduces or eliminates biofilms from the system.

While the above-noted biocidal active agent and procedure provides a biocidal effect that requires system flushing, the present invention can also be used with the continuous presence of an antiseptic active agent. In this case, the preferred antiseptic active agent that can provide such a continuous presence in the filtered water is a safe, natural product containing extracts from grapefruit seeds containing diphenol hydroxybenzene complex. Such an antiseptic agent is a heavy, viscous liquid that can be injected in the proper amounts at the mixing reservoir to allow a certain prescribed residual content. "Batches" of the filtered water with the antiseptic agent can be created with reasonable accuracy by mixing the proper amount of concentrated agent with a certain volume of water that is stored in the pressure tank 136. In this scenario, the main inlet (i.e., valve 104) to the system at the manifold system controller would be closed so that new water entering the system would not tend to dilute the mixture in storage tank 136. The antiseptic agent is added to the system in the same manner as the biocide(s) 129 (i.e., via mixing reservoir 132). When the mixture is depleted, a new batch can be made following the same steps, as described which only takes approximately two—three minutes. This natural antiseptic agent has been shown to be highly effective and tested against nearly 100 microorganisms including gram-positive and gram-negative bacteria, fungi & yeast, certain viruses as well as Giardia and other protozoa. Therefore, in addition to providing a biocidal effect to biofilms and other organisms, the present invention also provides for a continuous natural antiseptic effect that is safe for humans. This is particularly useful in the context of dental water lines that may be contaminated through system "suck-back."

Figure 3:
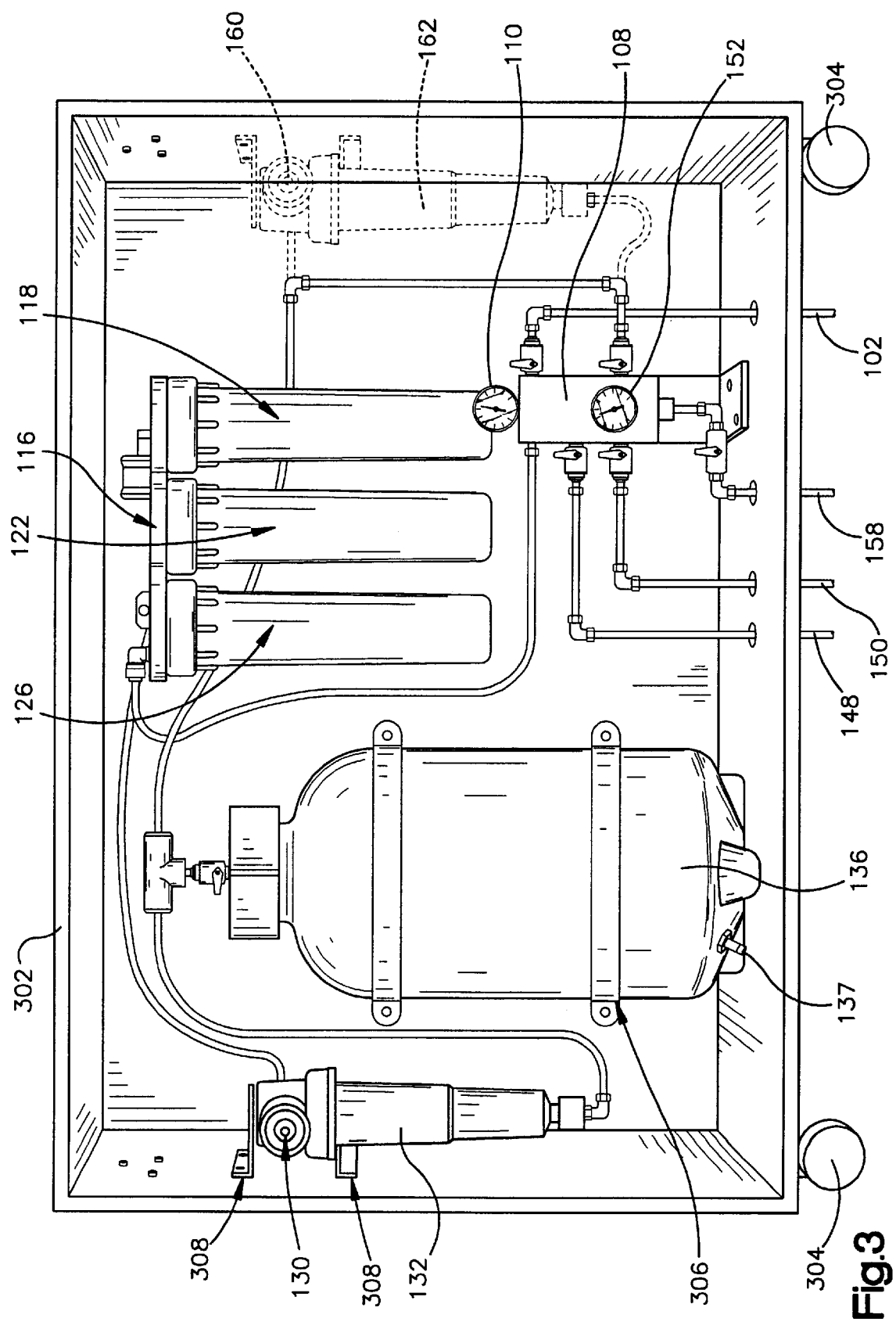
FIG. 3 is a front elevational view of a preferred physical arrangement of the first and second embodiments.

FIG. 3 is a front elevational view of a preferred physical arrangement of the first and second embodiments. As described earlier, the same reference numbers have been used to designate the same elements throughout FIGS. 1, 2, and 3. As shown, the system is housed within a cabinet 302 having hinged doors and a lock (not shown). The cabinet 302 is mounted on casters 304 that provide the system with mobility, if required. Additionally, the storage tank 136 is shown attached to the inner wall of cabinet 302 with stabilizer straps 306 that are fastened to the inner wall preferably with screws. Furthermore, mixing reservoir 132 is mounted to a side inner wall of cabinet 302 with mounting brackets 308 that are preferably attached to the side wall with screws. Mixing reservoir 162 is similarly fastened. All system components are firmly fastened or attached within the cabinet 302 with screws, rivets, bolts, or other similar fasteners to prevent component displacement from factory placement. The cabinet 302 is sized so as to provide adequate access to all system components for regular maintenance, repair, and/or inspection. So configured, the present invention is applicable to dental operatories for control of dental utility water line biofilms, medical facilities, laboratories, military field applications, as a portable emergency water supply station, and any application that requires the supply of biologically safe water.

Figure 4:
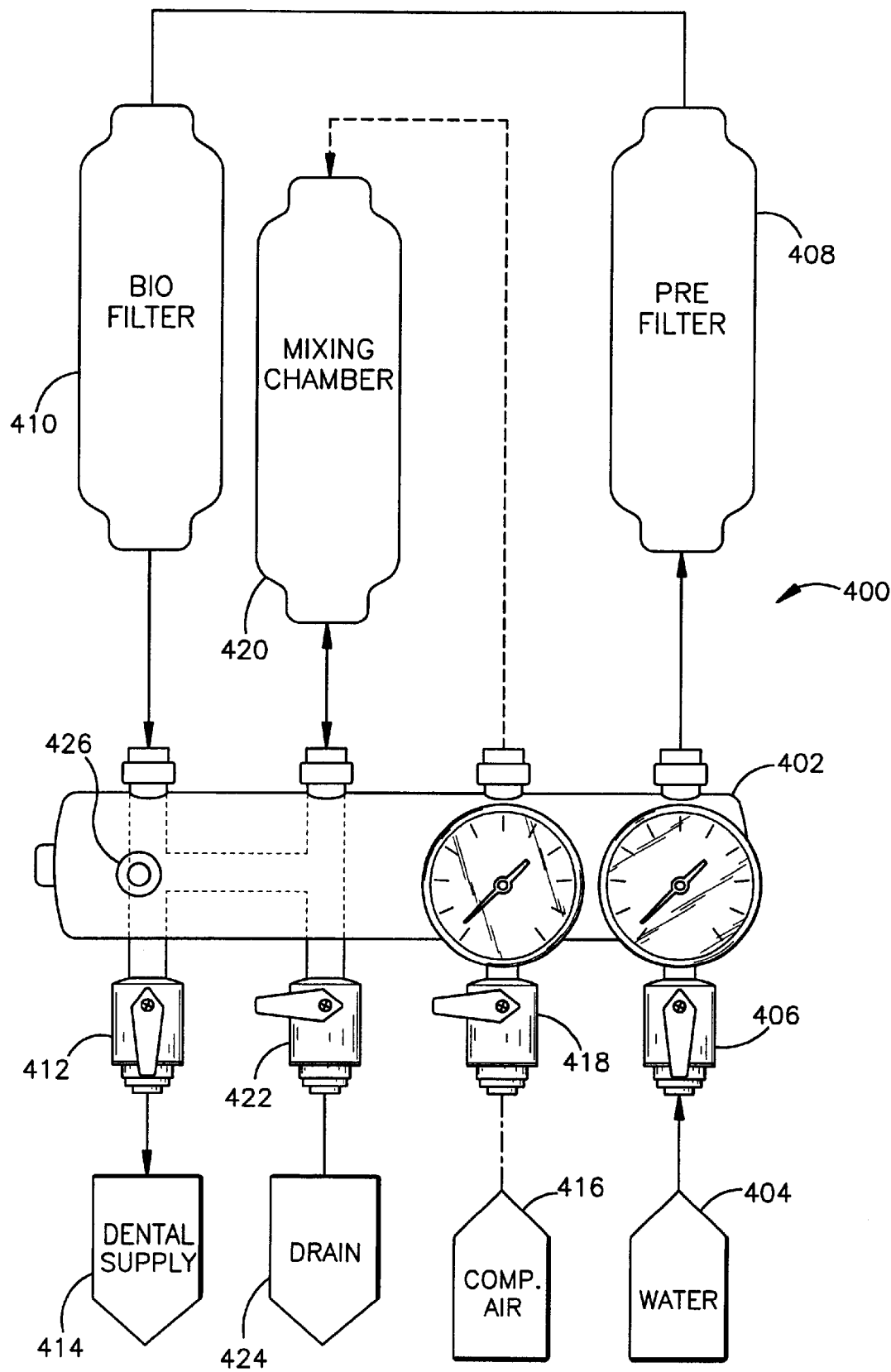
FIG. 4 is a diagram illustrating a third embodiment of the present invention.

Referring now to FIG. 4, a third embodiment of the present invention is shown. This embodiment is particularly suited for installations where space is an important consideration. The system 400 includes a manifold 402 that is in fluid communication with a pre-filter 408, bio-filter 410, and mixing chamber 420. The manifold 402 is preferably of a cylindrical cross-section geometry. However, other configurations including oval, rectangular, and triangular cross-sectional geometry can also be employed. A plurality of valves including valves 406, 412, 418, and 422 control the flow into and out of the manifold 402. So configured, system 400 includes a two service modes and a maintenance mode of operation. In the first service mode, filtered water is supplied to the operatories. In the second service mode, filtered including a residual amount of a natural active agent is supplied to the operatories.

In the first service mode, water 404 from a city supply, well, or other pressurized source enters the manifold 402 through valve 406. A pressure gauge is provided for monitoring the pressure of the water source. Water proceeds through the manifold 402 and enters pre-filter 408. Pre-filter 408 is a granular-activated carbon/sedimentation filter where particulates down to 25 microns are removed from the water. After the pre-filter 408, the water proceeds to bio-filter 410. Bio-filter 410 is a ceramic microbial filter that physically traps bacteria, certain viruses, cysts, protozoans, and other microbes. The ceramic microbial filter is a porous structure having a 0.9 micron pore structure contained within a polypropylene filter housing. After bio-filter 410, the now filtered water again enters manifold 402 where it exits through valve 412 and is directed to one or more dental operatories or a storage vessel similar to storage tank 136 of FIGS. 1, 2, and 3. The above-described service mode is accomplished placing valves 406 and 412 in the open position and valves 418 and 422 in the closed position.

In the second service mode, the system 400 is first depressurized by closing valves 406 and 418 and opening valve 422. Once the system 400 is depressurized, valve 422 is also closed. A concentrate of active agent is then injected through reverse check-valve 426 into the manifold 402. The system 400 is now pressurized with water by opening valve 406 causing the active agent and filtered water to mix in mixing chamber 420. Once system 400 is pressurized, valve 406 is once again closed. Valve 418 is opened to allow pressurized air 416 to enter manifold 402 to exert pressure on the mixed active agent and filtered water residing in mixing chamber 420. As the various appliances in the operatories are used, the compressed air 416 forces the active agent and filtered water mixture out of mixing chamber 420 and to dental supply 414. As already described, this service mode is used with a natural active agent such as, for example, grapefruit seed extract. Once the mixing chamber has been emptied by the pressurized air 416, the above-described procedure must be repeated to replenish the active agent and filtered water mixture in the mixing chamber 420.

It may be desirable on a weekly, monthly, or other frequency basis, to add an active agent or cleaner to the system 400 for destroying biofilms and organisms that may have entered the system at one or more points further away from the filters. In this maintenance mode, the system 400 is first depressurized by closing valve 406 and opening valve 422 to drain the manifold and filters. After the system 400 has drained, valve 422 is once again closed. The active agent or cleaner is then injected with a syringe into reverse check valve 426. Valve 406 is then opened to pressurize the system 400 and to mix the active agent with the filtered water in the mixing chamber 420. After pressurization and mixing, the valve 406 is once again closed. Pressurized or compressed air 416 is introduced into the system 400 by opening valve 418. At this stage, valves 406 and 422 are closed and valves 412 and 418 are open. The pressurized air 416 is used for forcing the active agent mixture out of the mixing chamber 420 and through valve 412 to the dental operatories. In the operatories, an operator now runs the various appliances that use the supplied water until the active agent mixture begins to emerge from such appliances. The active agent preferably includes a trace color (e.g., pink) so that the operator can detect the emergence thereof from the appliances. The active agent mixture preferably remains in the system 400 and dental operatories for a prescribed period of time that can range from minutes to hours depending on the type of active agent used. Suitable active agents include the same agents as described in connection with the embodiments of FIGS. 1, 2, and 3.

After disinfecting the system 400 and the operatories, the active agent mixture is flushed therefrom. This accomplished by now opening valve 422 to first flush manifold 402. Manifold 402 is flushed by the pressurized air 416 emptying mixing chamber 420 through drain 424. The operatories are now flushed by closing valve 418 and opening valve 406 to pressurize system 400 with filtered water. At this point, valves 406 and 412 are open and valves 418 and 422 are closed. The dental appliances in the operatories are now flushed until the trace color of the active agent is no longer present in the discharge.

Figure 5:
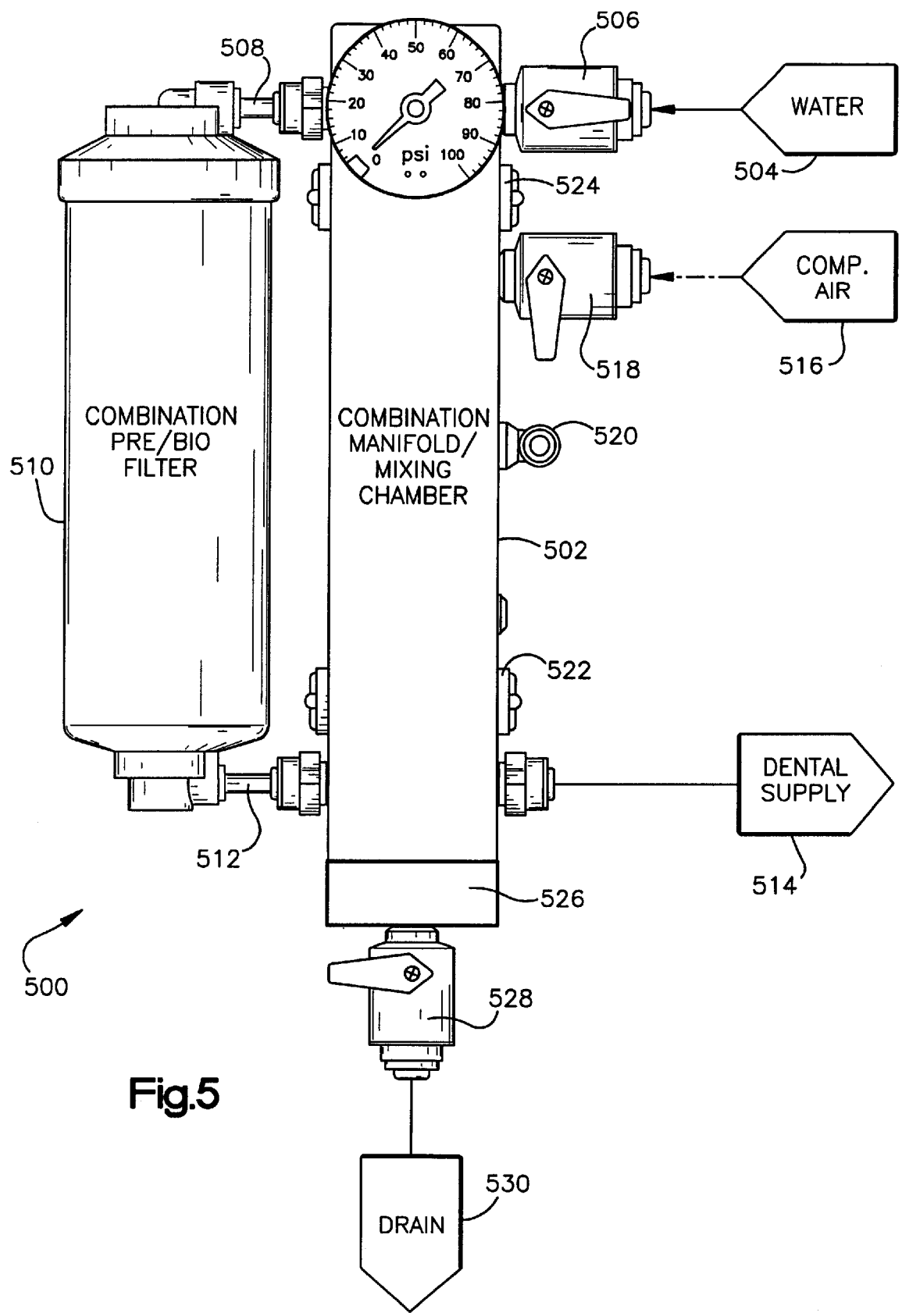
FIG. 5 is a diagram illustrating a fourth embodiment of the present invention.

Referring now to FIG. 5, a fourth embodiment of the present invention is shown. Similar to the embodiment shown in FIG. 4, this embodiment is also particularly suited for installations where space is an important consideration. The system 500 includes a combination manifold and mixing chamber 502 that is in fluid communication with a combination pre-filter and bio-filter 510. The combination manifold and mixing chamber 502 is preferably of a cylindrical cross-section geometry. However, other configurations including oval, rectangular, and triangular cross-sectional geometry can also be employed. A plurality of valves including valves 506, 518, and 528 control the flow into and out of the combination manifold and mixing chamber 502. Similar to the embodiment of FIG. 4, the system 500 also includes two service modes and a maintenance mode of operation. In the first service mode, filtered water is supplied to the operatories. In the second service mode, filtered including a residual amount of a natural active agent is supplied to the operatories.

In the first service mode of operation, water 504 from a city supply, well, or other pressurized source enters the combination manifold and mixing chamber 502 through valve 506. A pressure gauge is provided for monitoring the pressure of the water source. Water proceeds through the manifold and mixing chamber 502 and enters combination pre-filter and bio-filter 510 through tubing 508. The combination pre-filter and bio-filter 510 is shown in more detail in the cross-sectional view of FIG. 7.

Figure 7:
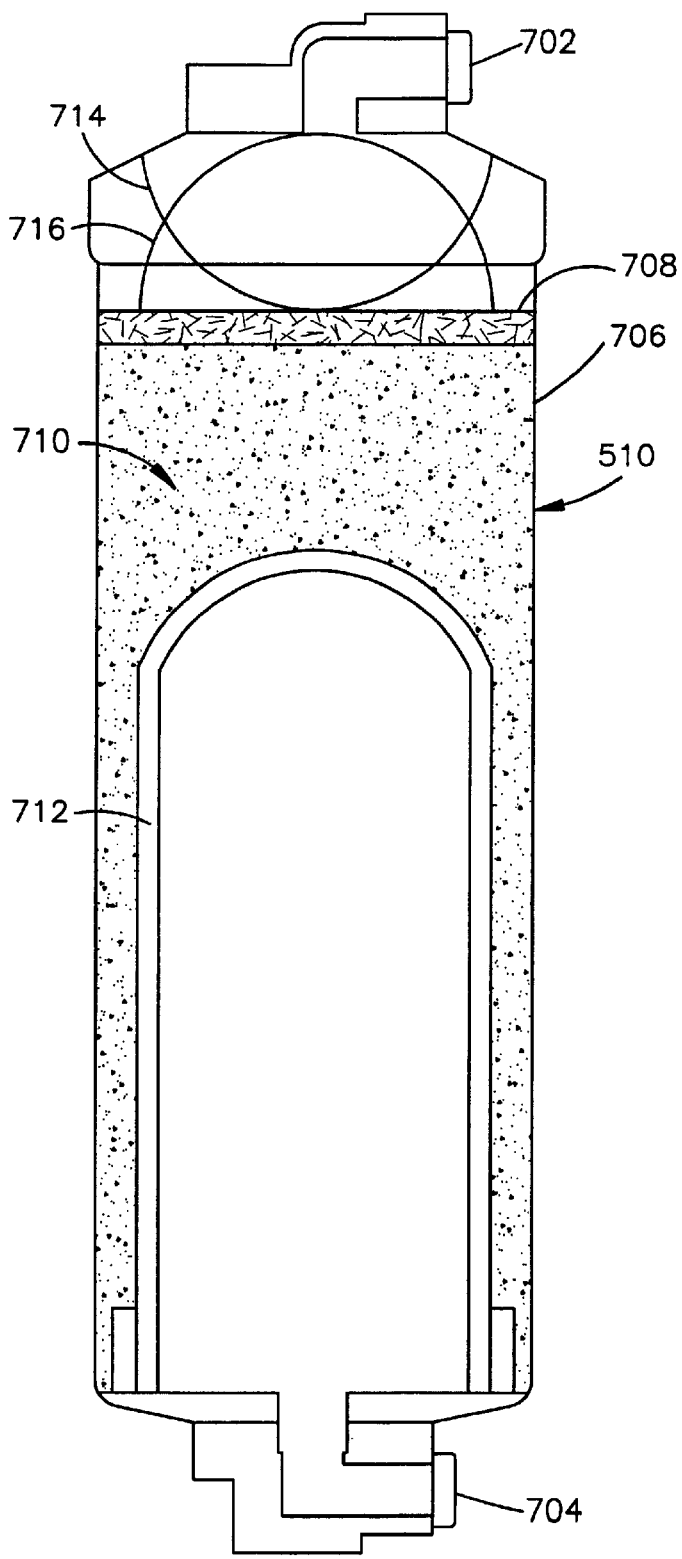
FIG. 7 is a cross-sectional diagram illustrating a combination pre-filter and bio-filter of the fourth embodiment.

Referring now to FIG. 7, the combination pre-filter and bio-filter 501 includes a cylindrical housing 706 having input 702 and output 704. Within housing 706, a pre-filter 710 having a bed of high-purity zinc and copper blend that provides for reduction-oxidation reactions. The preferred blend of zinc and copper is in the form of KDF 55 media. The pre-filter 710 preferably surrounds a cylindrical bio-filter 712. Bio-filter 712 is a ceramic microbial filter that physically traps bacteria, certain viruses, cysts, protozoans, and other microbes. The ceramic microbial filter is a porous structure having a 0.9 micron pore structure contained within a polypropylene filter housing. A porous pad 708, which is held in place by compression springs 714 and 716, maintains pre-filter 710 in a compacted state and filters particulates down to 10 microns. Compression springs 714 and 716 are preferably made from polypropylene or other food-grade material. So configured, water enters input 702 and passes through pad 708, pre-filter 710, and bio-filter 712 before it exits through output 704.

Referring once again to FIG. 5, the now filtered water leaves the combination pre-filter and bio-filter 510 and enters combination manifold and mixing chamber 502 through tube 512. The mixing chamber within combination manifold and mixing chamber 502 fills with filtered water. The filtered water is now ready to exit the combination manifold and mixing chamber 502 on its way to various dental operatories through dental supply 514.

Figure 6:
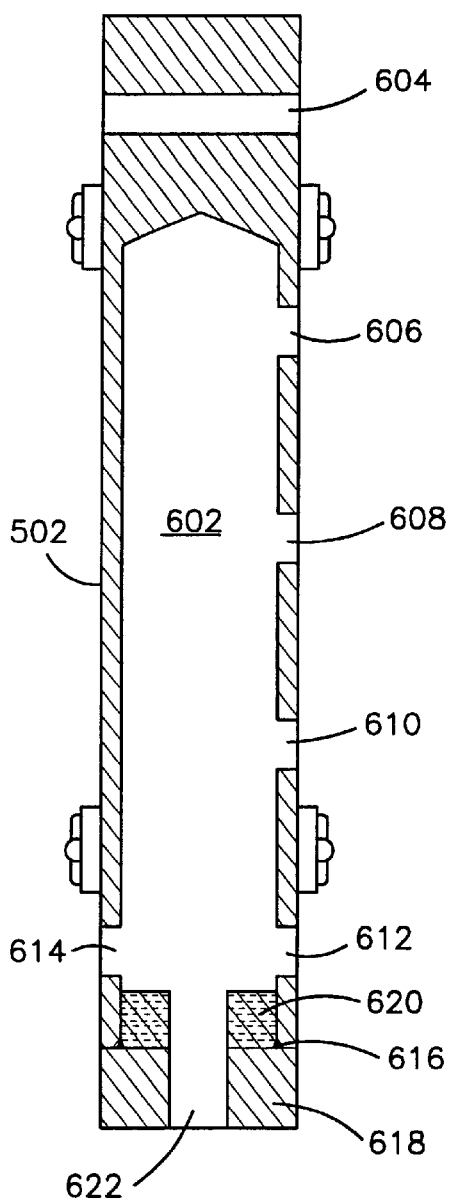
FIG. 6 is a cross-sectional diagram illustrating a combination manifold and mixing chamber of the fourth embodiment.

Referring now to FIG. 6, a cross-sectional view of the combination manifold and mixing chamber 502 of FIG. 5 is shown. The combination manifold and mixing chamber 502 includes a mixing chamber 602, supply water feed 604, compressed air feed 606, active agent feed 608, miscellaneous port 610, dental supply port 612, drain port 622 and filter output feed 614. All of the feeds and ports are preferably threaded for easy configuration with standard components such as valves, plugs, and quick connect and disconnect tube fittings. As shown in FIG. 5, valve 506 is connected to supply water feed 604, valve 518 is connected to compressed air feed 606, and valve 528 is connected to drain port 622. In the embodiment shown, miscellaneous port 610 is plugged. For ease of manufacture of the mixing chamber 602, the drain port 622 is formed in a removable end piece 618 that is threaded with threads 620 into and forms part of the combination manifold and mixing chamber 502. A rubber o-ring 616 is provided to seal the threaded interface.

In the second service mode, the system 500 is first depressurized by closing valves 506 and 518 and opening valve 528. Once the system 500 is depressurized, valve 528 is also closed. A concentrate of active agent is then injected through reverse check-valve 520 into the mixing chamber 602 (see FIG. 6). The system 500 is now pressurized with water by opening valve 506 causing the active agent and filtered water mix in mixing chamber 602. Once system 500 is pressurized, valve 506 is once again closed. Valve 518 is opened to allow pressurized air to enter mixing chamber 602 to exert pressure on the mixed active agent and filtered water residing. As the various appliances in the operatories are now used, the compressed air forces the active agent and filtered water mixture out of mixing chamber 602 and to dental supply 514. As mentioned, this service mode is used with a natural active agent such as, for example, grapefruit seed extract. Once the mixing chamber has been emptied by the pressurized air, the above-described procedure must be repeated to replenish the active agent and filtered water mixture in the mixing chamber 602.

Similar to the embodiment shown in FIG. 4, it may be desirable on a weekly, monthly, or other frequency basis, to add an active agent or cleaner to the system 500 for destroying biofilms and organisms that may have entered the system at one or more points further away from the filters. Referring now to FIG. 5, the maintenance mode is initiated by depressurizing system 500 by closing valve 506 and opening valve 528 to drain the manifold, filters, and mixing chamber. After system 500 has drained to drain 530, valve 528 is once again closed. The active agent or cleaner is then injected with a syringe into reverse check valve 520. Valve 506 is then opened to pressurize the system 500 and to mix the active agent with the filtered water in the mixing chamber 602 (shown in FIG. 6). After pressurization and mixing, the valve 506 is once again closed. Pressurized or compressed air is introduced into the system 500 by opening valve 518. At this stage, valves 506 and 528 are closed and only valve 518 is open. The pressurized air is used for forcing the active agent mixture out of the mixing chamber 602 and to the dental operatories through dental supply 514. In the operatories, an operator now runs the various appliances that use the supplied water until the active agent mixture begins to emerge from such appliances. As described earlier, the active agent preferably includes a trace color (e.g., pink) so that the operator can detect the emergence thereof from the appliances. The active agent mixture preferably remains in the system 500 and dental operatories for a prescribed period of time that can range from minutes to hours depending on the type of active agent used. Suitable active agents include the same agents as described in connection with the embodiments of FIGS. 1, 2, and 3.

After disinfecting the system 500 and the operatories, the active agent mixture is flushed therefrom. The is accomplished by now opening valve 528 to first flush the mixing chamber 602. The mixing chamber 602 is flushed by the pressurized air forcing any remaining active agent and water mixture through valve 528. The operatories are now flushed by closing valve 518 and opening valve 506 to pressurize system 500 with filtered water. At this point, valve 506 is the only open valve. The dental appliances in the operatories are now flushed through dental supply 514 until the trace color of the active agent is no longer present in the discharge.

Still referring to FIG. 5, the system 500 includes removable mounting flanges 524 and 522. Mounting flanges 524 and 522 allow for system 500 to mounted in the shown upright position or almost any other angle. The main consideration during mounting is that the drain port of mixing chamber 602 should configured to be at the lowest portion of the mounting to facilitate easy draining. The mounting flanges 524 and 522 can be of a plurality of well-known arrangements including arrangement for wall-mounting and mounting to a tube.

Figure 8:
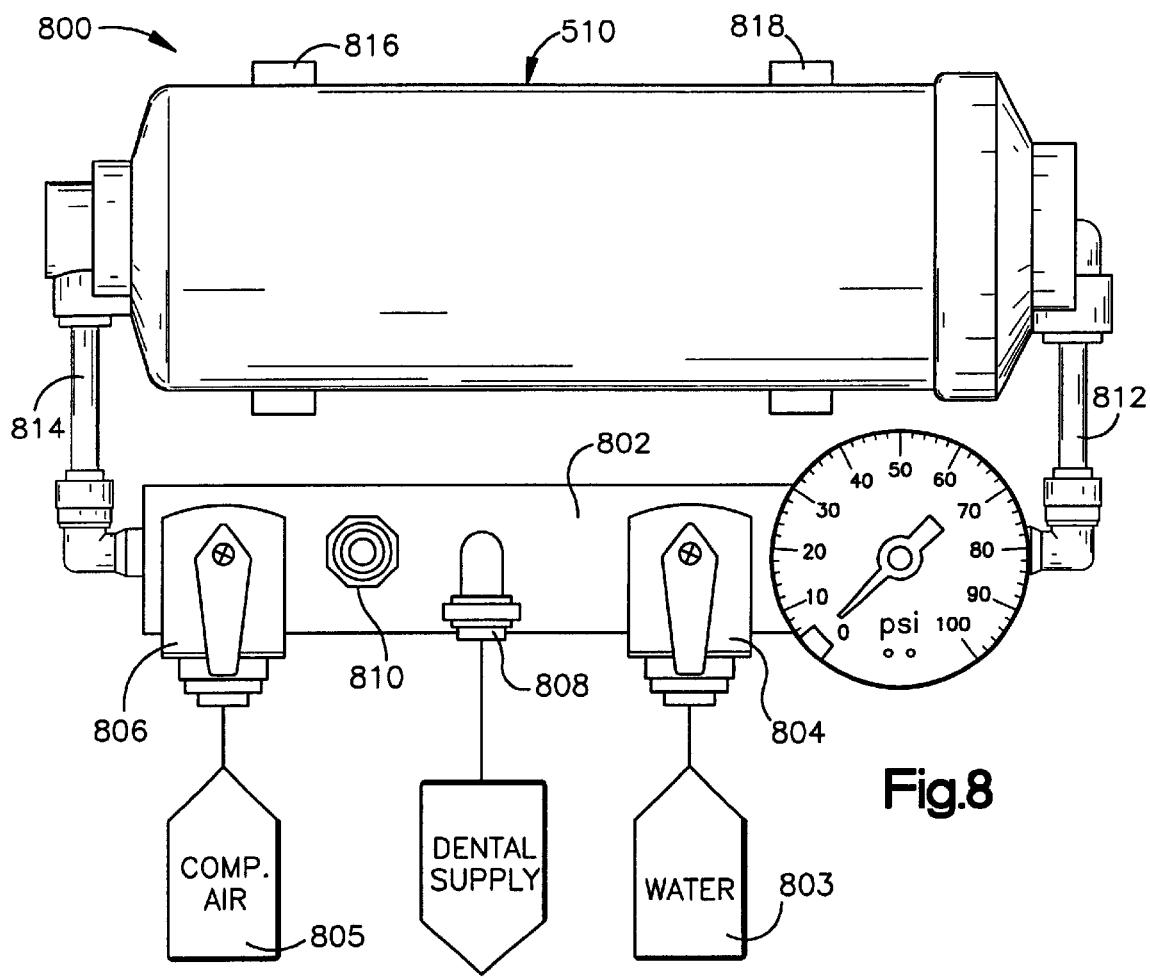
FIG. 8 is a diagram illustrating a fifth embodiment of the present invention.

Illustrated in FIG. 8 is a fifth embodiment of the present invention that is particularly suited for a single operatory or installations where space is an important consideration. The system 800 includes the same combination pre-filter and bio-filter 510 as shown in system 500 of FIG. 5 and in the cross-sectional illustration of FIG. 7. The system 800 includes a manifold 802 that is in fluid communication with the combination pre-filter and bio-filter 510 via tubes 812 and 814. The manifold 502 is preferably of a cylindrical cross-section geometry. However, other configurations including oval, rectangular, and triangular cross-sectional geometry can also be employed. A plurality of valves including valves 804 and 806 control the flow water and compressed air 805 into and out of the system 800. Manifold 802 further includes an active agent injection port 810 and supply port 808. As described in the earlier embodiments, active agent injection port 810 is preferably in the form of a reverse check valve. Mounting flanges 816 and 818 are also provided for mounting system 800 to a wall, cabinet, or other mounting or installation surface. System 800 includes a service mode and a maintenance mode of operation.

In the service mode, filtered water is supplied to the operatories. More specifically, water 803 from a city supply, well, or other pressurized source enters the manifold 802 through valve 804. As in earlier embodiments, a pressure gauge is provided for monitoring the pressure of the water source. Water proceeds through the manifold 802 and enters combination pre-filter and bio-filter 510 through tubing 812 where it is filtered. The now filtered water leaves the combination pre-filter and bio-filter 510 and re-enters manifold 802 through tube 814. The filtered water is now ready to exit the manifold 802 via supply port 808 on its way to the appliances of the connected dental operatory.

Figure 9:
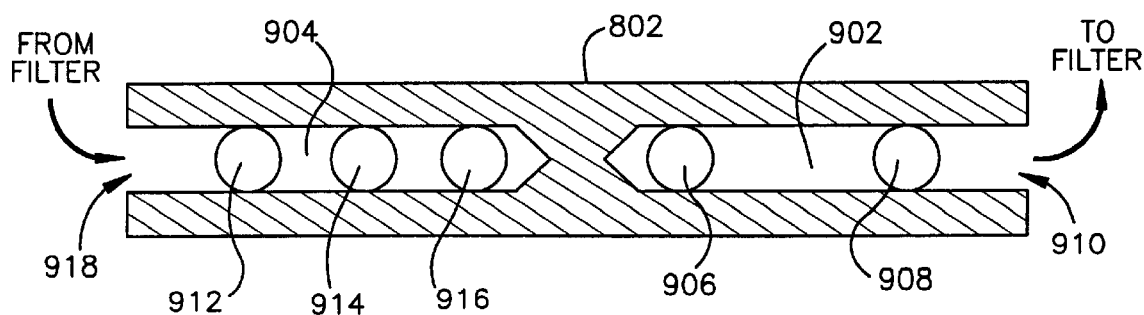
FIG. 9 is a cross-sectional diagram illustrating a manifold structure of the fifth embodiment.

Referring now to FIG. 9, a cross-sectional view of the manifold 802 of FIG. 8 is shown. The manifold 802 includes a first channel 902 and a second channel 904. First channel 902 has a supply water feed 906, a pressure gauge interface port 908, and an exit 910 to filter 510. Second channel 904 has a compressed air feed 912, active agent feed 914, dental supply port 916, and input 918 from filter 510. All of the feeds, ports, inputs, and exits are preferably threaded for easy configuration with standard components such as valves, plugs, and quick connect and disconnect tube fittings.

With regard to the maintenance mode, it may be desirable on a weekly, monthly, or other frequency basis, to add an active agent or cleaner to the system 800 for destroying biofilms and organisms that may have entered the system at one or more points further away from the filters. Referring now to FIG. 8 once again, the maintenance mode is initiated by depressurized system 800 by closing valve 804 and running one or more of the appliances connected to the dental supply port 808. In this manner, the appliances are used to drain and depressurize manifold 802. After system 800 has drained, an active agent or cleaner is then injected with a syringe into reverse check valve 810. Valve 804 is then opened to once again pressurize the system 800. At this point, a single appliance in the operatory is run until the trace color of the active agent appears in the appliance's discharge. This procedure of depressurizing, introducing a quantity of active agent, and re-pressurizing is repeated for each appliance in the operatory because system 800 does not include a mixing or reservoir chamber that can hold enough active agent to fill all of the delivery lines to all of the dental appliances.

Figure 10:
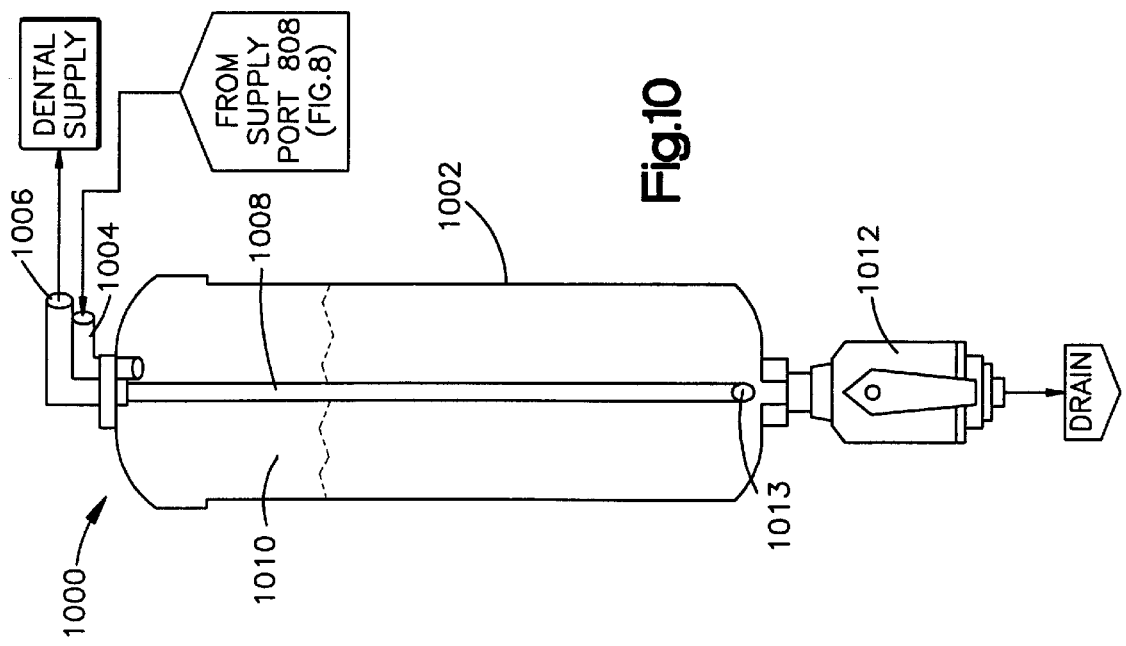
FIG. 10 is cross-sectional diagram illustrating an optional mixing/reservoir chamber of the present invention.

However, an optional mixing chamber/reservoir 1000 is shown in cross-section in FIG. 10 that can be easily attached to the supply port 808 of FIG. 8 to provide the required capacity. As shown, mixing chamber/reservoir 1000 is preferably has a generally cylindrical housing 1002 that includes an input feed 1004, supply output 1006, and a drain connected to drain valve 1012. Supply output 1006 is connected to a dip tube 1008 that preferably runs through the center and almost entire depth of mixing chamber/reservoir 1000.

In operation, filtered water or active agent mixture (i.e., active agent and filtered water) enters mixing chamber/reservoir 1000 through input feed 1004 and is contained within the interior space 1010 thereof. To discharge the contents of mixing chamber/reservoir 1000, air is forced into input feed 1004 thereby pressurizing interior space 1010 and mixing chamber/reservoir 1000. Running any appliance in the operatory connected to supply output 1006 will allow the pressurized air within interior space 1010 to force any resident fluids out of interior space 1010 via dip tube entrance 1012, through dip tube 1008 and supply output 1006 to the appliance. The mixing chamber/reservoir 1000 can also be drained or depressurized by opening valve 1012. Hence, coupling mixing chamber/reservoir 1000 with system 800 of FIG. 8 provides the same capacity and overall functionality is described for the earlier embodiments.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, tubing or hose size may be changed, additional valves may be added in the fluid flow paths, additional pressurized storage tanks and mixing reservoirs may be added, pressure booster pumps and flow meters can be installed within the system, an ultraviolet light disinfection unit can be placed in the fluid flow path, and option filtration modules for the reduction of dissolved solids in the fluid can also be added to the system. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A manifold structure in a water treatment system, the manifold structure having a housing comprising:
   (a) an inlet port in fluid communication with a fluid source;
   (b) a self-sealing active agent input port configured to at least partially receive therein an active agent injector and to self-seal when the active agent injector is not received therein.
   (c) a pressurized air input port;
   (d) a mixing chamber in fluid communication with the active agent input port and the pressurized air input port; and
   (e) an output port in fluid communication with the mixing chamber.

2. The manifold structure of claim 1 wherein the active agent input port comprises a check valve in fluid communication with the mixing chamber.

3. The manifold structure of claim 1 wherein the housing is substantially cylindrical.

4. A manifold structure in a water treatment system, the manifold structure having a housing comprising:
   (a) an inlet port in fluid communication with a fluid source;
   (b) an active agent input port;
   (c) a pressurized air input port;
   (d) a mixing chamber in fluid communication with the active agent input port and the pressurized air input port;
   (e) an output port in fluid communication with the mixing chamber; and
   (f) a drain port in fluid communication with the mixing chamber.

5. A system for controlling the presence of microorganisms in fluids comprising:
   (a) a manifold structure having a housing, the housing comprising:
      (i) an inlet port in fluid communication with a fluid source;
      (ii) an active agent input port;
      (iii) a pressurized air input port;

(iv) a mixing chamber in fluid communication with the active agent input port and the pressurized air input port; and (v) an output port in fluid communication with the mixing chamber; and (vi) a drain port in fluid communication with the mixing chamber; and (b) a filter in fluid communication with the manifold structure.

6. The system of claim 5 wherein the filter comprises a pre-filter for removing particulate matter, carbon-activated matter, and oxidizable matter.

7. The system of claim 5 wherein the filter comprises a bio-filter for removing bacterial matter.

8. The system of claim 5 wherein the filter comprises a pre-filter for removing particulate matter, carbon-activated matter, and oxidizable matter, and a bio-filter for removing bacterial matter.

9. The system of claim 8 wherein the pre-filter surrounds the bio-filter.

10. The system of claim 9 wherein the pre-filter and bio-filter reside within a single filter housing.

11. A system for controlling the presence of microorganisms in a fluid comprising:

(a) an inlet for connection to a fluid source;

(b) a filter in fluid communication with the inlet, the filter having:
(i) a first filter for removing particulate matter from the fluid;
(ii) a second filter for removing carbon-activated and oxidizable matter from the fluid; and
(iii) a third filter for removing bacterial matter from the fluid;

(c) a mixing reservoir in fluid communication with the filter and having a self-sealing active agent input configured to at least partially receive therein an active agent injector and to self-seal when the active agent injector is not received therein, the mixing reservoir providing for the mixing of fluid and active agent;

(d) a pressurized storage tank in fluid communication with the mixing reservoir and for storing mixed fluid and active agent; and (e) a control manifold in fluid communication with the pressurized storage tank and for controlling the flow of fluid in the system.

12. The system of claim 11 wherein the first filter comprises blown polypropylene.

13. The system of claim 11 wherein the second filter comprises a carbon block.

14. The system of claim 11 wherein the third filter comprises a porous ceramic.

15. The system of claim 11 wherein the active agent input of the mixing reservoir comprises a reverse check valve.

16. The system of claim 11 wherein the pressurized storage tank comprises a pre-charged air chamber.

17. The system of claim 11 further comprising an active agent for flowing out of the system and comprising a biocidal chemical agent.

18. The system of claim 11 further comprising an active agent for flowing out of the system and comprising an antiseptic agent.

19. The system of claim 18 wherein the antiseptic agent comprises an aqueous cleaner derived from natural citrus botanicals.

20. The system of claim 18 wherein the antiseptic agent comprises diphenol hydroxybenzene.

21. A system for controlling biofilms and microorganisms in dental water lines comprising:

(a) an inlet for connection to a water source;

(b) a filter in fluid communication with the inlet and for removing matter selected from the group consisting of: particulate matter, carbon-activated matter, oxidizable matter, bacterial matter, and combinations thereof;

(c) a mixing reservoir in fluid communication with the filter and having a self-sealing active agent input configured to at least partially receive therein an active agent injector and to self-seal when the active agent injector is not received therein, the mixing reservoir providing for the mixing of water and active agent;

(d) a pressurized storage tank in fluid communication with the mixing reservoir and for storing mixed water and active agent; and (e) a control manifold in fluid communication with the pressurized storage tank and water source inlet and for controlling the flow of water in the system.

22. The system of claim 21 wherein the active agent input of the mixing reservoir comprises a reverse valve.

23. The system of claim 21 wherein the pressurized storage tank comprises a pre-charged air chamber.

24. The system of claim 21 further comprising an active agent for flowing out of the system and comprising a biocidal chemical agent.

25. The system of claim 21 further comprising an active agent for flowing out of the system and comprising an antiseptic agent.

26. The system of claim 25 wherein the antiseptic agent comprises an aqueous cleaner derived from natural citrus botanicals.

27. The system of claim 25 wherein the antiseptic agent comprises diphenol hydroxybenzene.

28. A manifold structure in a water treatment system, the manifold structure having a housing comprising:

(a) an inlet port in fluid communication with a fluid source;

(b) a self-sealing an active agent input port configured to at least partially receive therein an active agent injector and to self-seal when the active agent injector is not received therein;

(c) a pressurized air input port in fluid communication with the self-sealing active agent input port; and (d) an output port in fluid communication with the self-sealing active agent input port.

29. The manifold structure of claim 28 wherein the self-sealing active agent input port comprises an input aperture configured to at least partially receive the active agent injector therein.

30. The manifold structure of claim 28 wherein the self-sealing active agent input port comprises a channel configured to at least partially receive the active agent injector therein.

31. A system for controlling the presence of microorganisms in a fluid comprising:

(a) a manifold structure having a housing, the housing comprising:
(i) an inlet port in fluid communication with a fluid source;
(ii) a self-sealing active agent input port configured to at least partially receive therein an active agent injector and to self-seal when the active agent injector is not received therein;
(iii) a pressurized air input port in fluid communication with the self-sealing active agent input port; and (iv) an output port in fluid communication with the self-sealing active agent input port; and (b) a filter in fluid communication with the manifold structure.

32. The system of claim 34 wherein the self-sealing active agent input port comprises an input aperture configured to at least partially receive the active agent injector therein.

33. The system of claim 31 wherein the self-sealing active agent input port comprises a channel configured to at least partially receive the active agent injector therein.

34. The system of claim 31 wherein the filter comprises a combination pre-filter and bio-filter having:

(a) a pre-filter for providing oxidation reduction reactions with the fluid to be filtered; and (b) a bio-filter substantially surrounded by the pre-filter and for filtering microbials from the fluid.

35. The system of claim 34 wherein the filter further comprises a resilient spring device and a porous material wherein the resilient spring device and porous material act in combination to maintain the pre-filter in a compacted state.

\* \* \* \* \*